US009207995B2

(12) United States Patent
Boersma et al.

(10) Patent No.: US 9,207,995 B2
(45) Date of Patent: Dec. 8, 2015

(54) MECHANISM TO SPEED-UP MULTITHREADED EXECUTION BY REGISTER FILE WRITE PORT REALLOCATION

(75) Inventors: Maarten J. Boersma, Holzgerlingen (DE); Markus Kaltenbach, Leinfelden (DE); Jens Leenstra, Bondorf (DE); Tim Niggemeier, Laatzen (DE); Philipp Oehler, Gaertringen (DE); Philipp Panitz, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1175 days.

(21) Appl. No.: 13/170,003

(22) Filed: Jun. 27, 2011

(65) Prior Publication Data

US 2012/0110271 A1    May 3, 2012

(51) Int. Cl.
*G06F 9/30* (2006.01)
*G06F 9/52* (2006.01)
*G06F 9/38* (2006.01)

(52) U.S. Cl.
CPC .............. *G06F 9/52* (2013.01); *G06F 9/3012* (2013.01); *G06F 9/30123* (2013.01); *G06F 9/30141* (2013.01); *G06F 9/30189* (2013.01); *G06F 9/3891* (2013.01)

(58) Field of Classification Search
CPC ...................... G06F 9/3012; G06F 9/30141
See application file for complete search history.

(56) References Cited

U.S. PATENT DOCUMENTS

| 6,092,175 | A | 7/2000 | Levy et al. | |
|---|---|---|---|---|
| 6,188,633 | B1 | 2/2001 | Naffziger | |
| 7,472,258 | B2 | 12/2008 | Burky et al. | |
| 7,487,505 | B2 | 2/2009 | Rosenbluth et al. | |
| 2003/0033509 | A1* | 2/2003 | Leibholz et al. | 712/228 |
| 2004/0073779 | A1 | 4/2004 | Hokenek et al. | |
| 2007/0239970 | A1* | 10/2007 | Liao et al. | 712/225 |
| 2008/0313437 | A1 | 12/2008 | Gschwind | |

FOREIGN PATENT DOCUMENTS

EP    2037358 A1    3/2008

OTHER PUBLICATIONS

Ergin, Oguz, "Register File Optimizations for Superscalar Microprocessors," Dissertation to the Department of Computer Science, 2005, State University of New York at Binghamton (171 pages).

(Continued)

*Primary Examiner* — Boris Gorney
*Assistant Examiner* — John Lindlof
(74) *Attorney, Agent, or Firm* — James L. Baudino

(57) ABSTRACT

Various systems and processes may be used to speed up multi-threaded execution. In certain implementations, a system and process may include the ability to write results of a first group of execution units associated with a first register file into the first register file using a first write port of the first register file and write results of a second group of execution units associated with a second register file into the second register file using a first write port of the second register file. The system, apparatus, and process may also include the ability to connect, in a shared register file mode, results of the second group of execution units to a second write port of the first register file and connect, in a split register file mode, results of a part of the first group of execution units to the second write port of the first register file.

12 Claims, 6 Drawing Sheets

(56) References Cited

OTHER PUBLICATIONS

Kim, Nam S., et al., "Reducing Register Ports Using Delayed Write-Back Queues and Operand Pre-Fetch," ICS '03, San Francisco, CA, Jun. 23-26, 2003, ACM (11 pages).

Nuth, Peter R., "The Named-State Register File," Technical Report 1459, Aug. 1993, Massachusetts Institute of Technology, Boston, MA (136 pages).

Saghir, Mazen A. R., et al., "A Configurable Multi-Ported Register File Architecture for Soft Processor Cores," ARC 2007, American University of Beirut, Beirut, Lebanon (12 pages).

Towner, Daniel W., "The Uniform Heterogeneous Multi-Threaded Processor Architecture," Dissertation to the Department of Computer Science, Jun. 2002, University of Bristol. Bristol, England (217 pages).

* cited by examiner

MECHANISM TO SPEED-UP MULTITHREADED EXECUTION BY REGISTER FILE WRITE PORT REALLOCATION

BACKGROUND

The invention relates generally to a processor adapted to be operable in a single-thread mode and a multi-thread mode and a method for operating a processor in a single-thread mode and a multi-thread mode.

In today's microprocessors, in particular server class processors, the capability to provide enhance processing performance in both a single-thread (ST) and a multi-thread (MT) environment becomes a significant differentiator in processor design. As processor architectures have moved to wider super-scalar configurations, it has proven to be a challenge to let multiple execution units operate on the same data in an ST setup (e.g., because of timing conflicts that may occur between the multiple execution units at the time an execution finishes).

Such a processor could have a single register file serving all execution units in the processor needed for operand data and result write-back. However, this drives the need for excessive amounts of read/write ports on such register files, which may cause a series of negative consequences like high power and physical space consumption.

There is also a trend towards more multi-threaded setups with 2, 4 and more threads within the same processor. The nature of multi-threading expands the choice for a processor's scheduling unit to select instructions to run on the execution units that cannot access data from all threads, but only from a particular set of threads. As the number of threads grows, the amount of registers a processor needs to handle exceeds physical and frequency constraints. Current architectures try to solve this problem by implementing multiple register files.

BRIEF SUMMARY

According to one general implementation, a processor may include a first register file and a second register file for storing state information of one or more threads, wherein the first register file and the second register file each include a first write port and a second write port, a first group of execution units associated to the first register file, and a second group of execution units associated to the second register file. The register files may be adapted to be operable in a shared mode and in a split mode, such that in the shared mode, the first register file and the second register file contain the same thread information, and in the split mode, threads executed by the processor being in a multi-thread mode are grouped in a first thread set and a second thread set, and the first register file contains information of the first thread set, and the second register file contains information of the second thread set. Additionally, the first write port of the first register file may be adapted to be used by the first group of execution units for writing their results into the first register file, and the first write port of the second register file may be adapted to be used by the second group of execution units for writing their results into the second register file. The processor may also include a first data controller adapted to, in the shared mode, connect results of the second group of execution units to the second write port of the first register file and, in the split mode, connect the results of a part of the first group of execution units to the second write port of the first register file.

According to another general implementation, a process for operating a processor may include storing state information of one or more threads in a first register file and a second register file that each include a first write port and a second write port and operating the register files in a shared mode such that the register files contain the same thread information and in a split mode such that threads executed by the processor being in a multi-thread mode are grouped in a first thread set and a second thread set, the first register file containing information of the first thread set and the second register file containing information of the second thread set. The process may also include writing results of a first group of execution units associated with the first register file into the first register file using the first write port of the first register file and writing results of a second group of execution units associated with the second register file into the second register file using the first write port of the second register file. The process may additionally include connecting, in the shared mode, results of the second group of execution units to a second write port of the first register file and connecting, in the split mode, results of a part of the first group of execution units to the second write port of the first register file.

DETAILED DESCRIPTION

Figure 1:
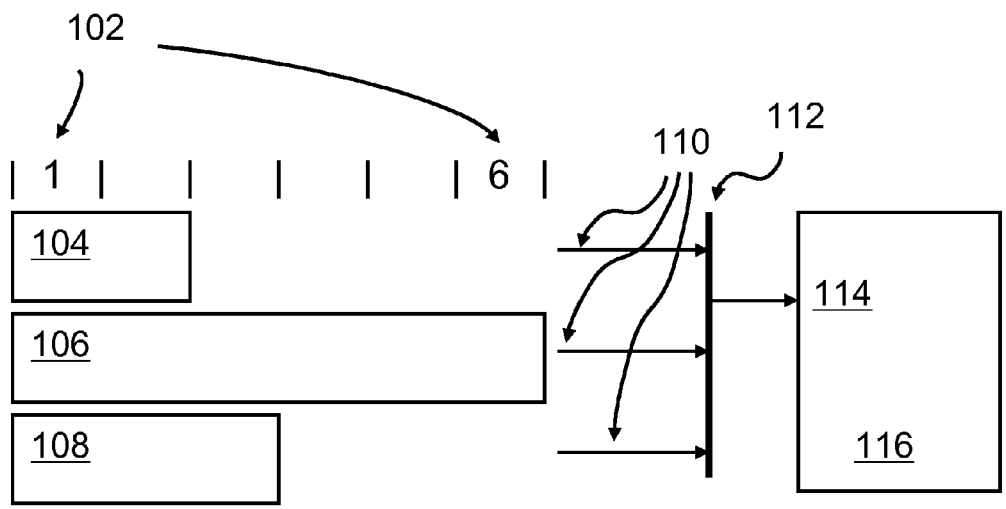
FIG. 1 shows a block diagram of execution units requiring a different number of cycles to complete an instruction.

A processor including a register file with multiple write ports may have its execution bandwidth increased by reallocating at least one write port between various execution units. For example, for a set of execution units associated with a register file, all of the execution units may write their results to a first write port of the register file in a first mode and a first execution unit may write its results to the first write port and a second execution unit may write its results to a second write port of the register file in a second mode. Thus, collisions that may occur when multiple execution units associated with a register file produce results at the same time may be avoided in the second mode, allowing multiple execution units to operate at the same time.

In the context of this application, the following principle terms are used:

A register file—This term may denote an array of processor registers in a central processing unit. They may be implemented as static RAM (random access memory). This set of registers may be used for staging data between memory and other functional units on the processor chip. Register files may, in particular, be used for storing architectural state and speculative state or simply state information.

State Information—The term state information state may denote data stored in register files defining the status of a part of a processor. In particular, instructions, operands and addresses, and special flags may define the architectural state. The term may also include speculative state information and may also denote information in look-ahead registers or temporary storage from or for look-ahead calculations. Each register file may store state information of a different thread or a different group of threads.

Shared mode—This term may denote a mode of operation of a processor having at least two register files and at least two execution units, wherein both register files may contain the same data. This mode may typically be used for a single-thread operation of a processor.

Split mode—In contrast to the shared mode, this term may denote a mode of operation of a processor in which the two register files may contain different data. This mode may typically be used for a multi-thread operation of a processor.

It should be noted that thread sets may include only one thread each, but that also several threads may be possible in one thread set. A skilled person will also understand that data may include instructions, operands as well as addresses.

The aspects defined above and further aspects are apparent from the example embodiments to be described hereinafter and are explained with reference to the examples of embodiments. These embodiments, however, are not limitations.

In the following, a detailed description of the drawings will be given. All illustrations in the drawings are schematic. Firstly, a block diagram of prior art technologies will be described.

FIG. 1 illustrates different execution units with different cycle time requirements. The processor cycles may be illustrated by reference numeral 102, referring to 1 to 6 cycles, indicated by vertical lines with numbers 1 to 6 in-between. As illustrated, there are a fixed point unit (FXU) 104 requiring two cycles for completion of a command, a floating point unit (FPU) 106 requiring six cycles for completion of a command, and a permutation unit (PERM) 108 requiring three cycles for completion of a command. It should be noted that the number of execution cycles required are mere examples to demonstrate the potential conflict. All units 104, 106, 108 may be required to write their computing results to a register file 116. However, this would require a high number of write ports. If the number of computing units 104, 106, 108 may be multiplied due to higher throughput, the number of write ports 114 to the register file may also grow dramatically. Because of physical and space limitations on a chip, this may not be an option. Therefore, the output ports of the execution units 104, 106 and 108 may be fed to a common bus 112 via lines 110. The bus signals may then be fed to a write port 114 of the register file 116.

Figure 2:
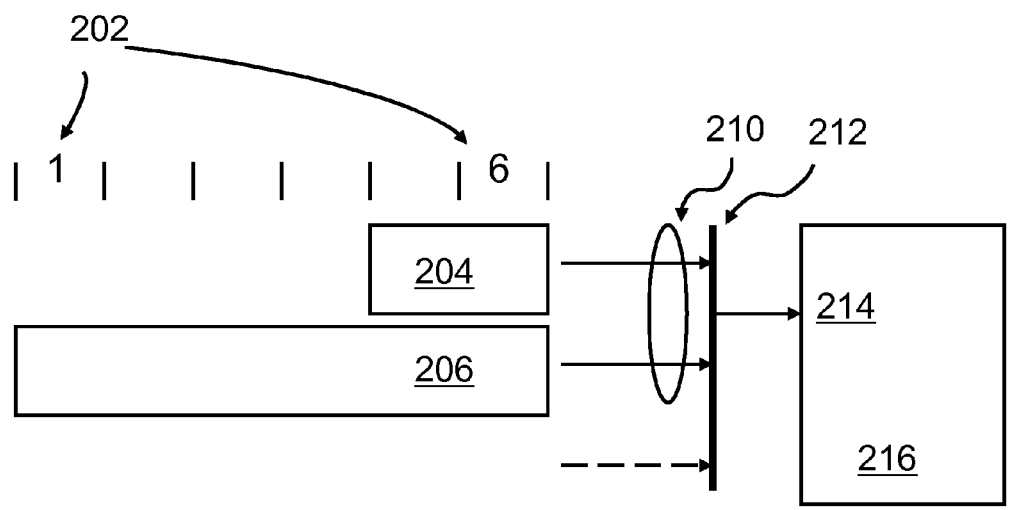
FIG. 2 shows a block diagram of execution units being in conflict trying to write to a register file at the same time.

FIG. 2 illustrates potential write-back conflicts between the computing or execution units 204 and 206 feeding their results to a write port 214 of a register file 216. The results of the execution units may again be delivered via lines 210 to a bus 212, which signals may be fed to the write port 214 of the register file 216. Processor cycles are shown by reference numeral 202. However, not all units may start a computation at the same cycle 202. Unit 204—which may be a FXU—may start at cycle 4, while execution unit 206—which may be a FPU—may start at cycle 1. At the end of cycle 6, there may be a conflict on bus 212 as indicated by symbol 210. It may not be possible that two units deliver their result at the same time, i.e., in the same cycle to the bus 212 or the write port 214. Electrical short cuts would be the consequence. Consequently, in conventional designs, only one execution unit per register file may be active at the same time, interval or cycle.

Figure 3:
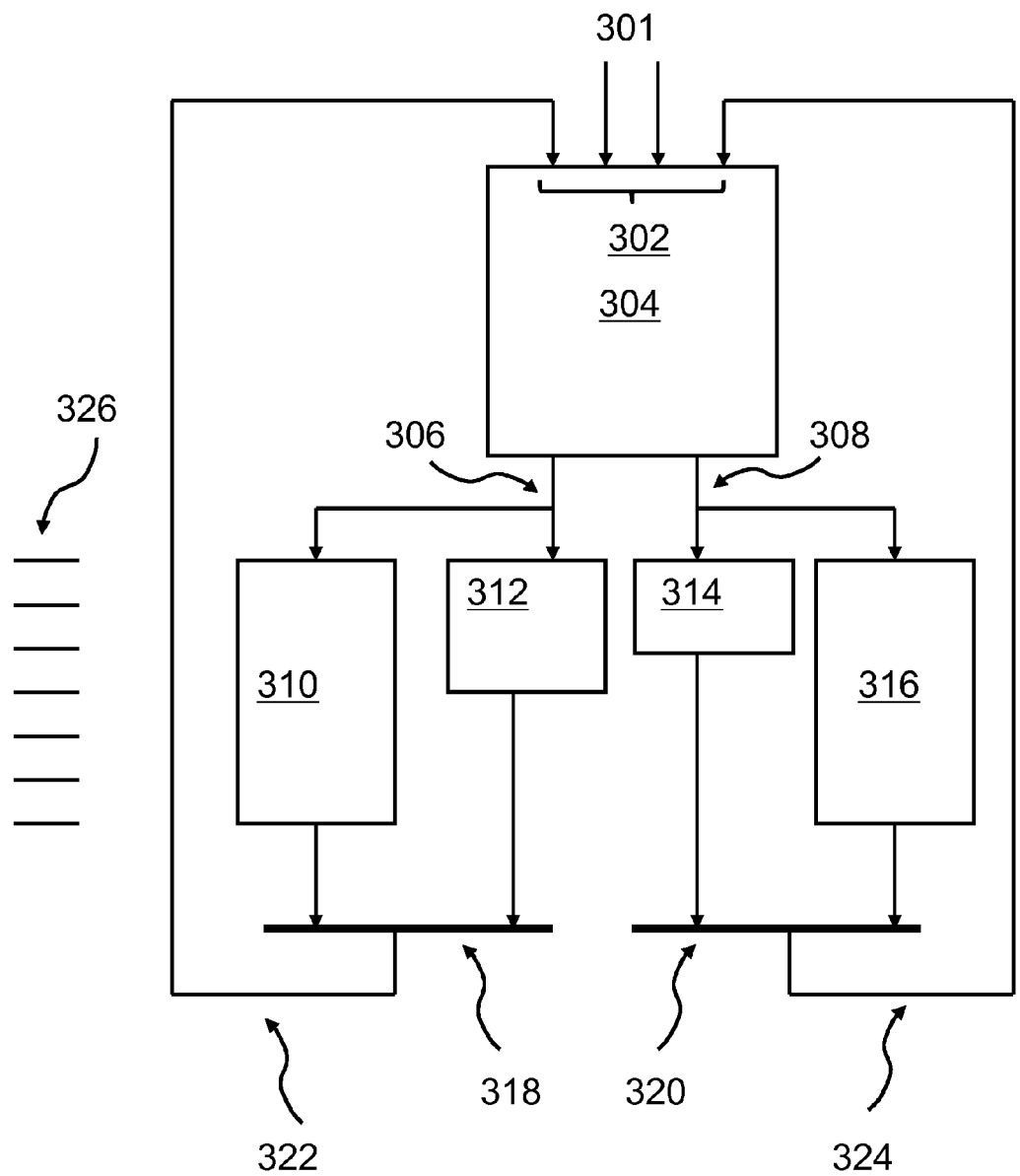
FIG. 3 shows a block diagram of an embodiment of a register file with different execution units.

FIG. 3 illustrates a conventional potential solution for such a situation. One single register file 304 may be used in conjunction with multiple execution units, e.g., a FPU 310, an FXU 312, a PERM 314, and another FPU 316. The units may be grouped into two groups comprising FPU 310 and PERM 312, on one side, and FXU 314 and FPU 316, on the other side. The output from the common register file 304 may be delivered via read port 306 to the first group of units and via read port 308 to the other group of units 314 and 316. A bus 318 may collect the results from execution units 310 and 312 and may feed the signals via line 322 to one of the write ports 302 of the register file 304. Another bus 320 for the second group comprising of units 314 and 316 may feed resulting signals via line 324 to another write port 302 of the register file 304. There may be more write ports 302 provided at the register file 304 for loading data of threads 301. The write ports may be addressable individually.

The required cycles per execution unit 310, 312, 414, 316 may symbolically be indicated by the scale 326. However, also here the number of cycles may be mere examples. The exact number of cycles required may be irrelevant as long as the number of parts of different execution units may be different.

Figure 4:
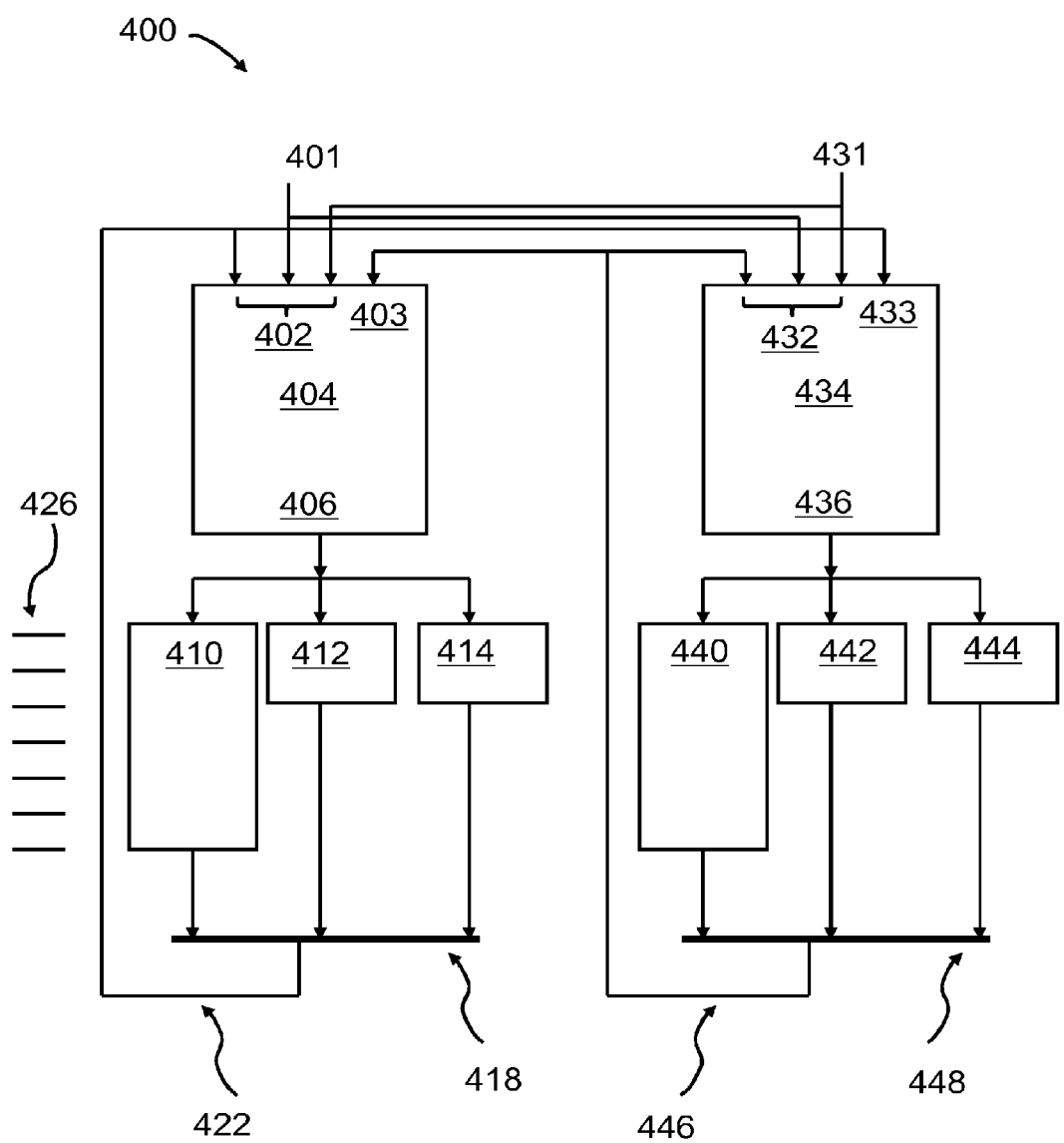
FIG. 4 shows a block diagram of a prior art processor with two register files.

FIG. 4 shows a block diagram of a prior art processor 400 with two register files 404 and 434. In case the number of parallel working execution units 410, 412, 414, 440, 442, 444—many of those are possible—may grow, a single register file may become a bottleneck because it may become too large having too many storage registers. This may in particular be the case if many threads are present. Therefore, the processor may be split into two groups, i.e., a left group, including register file 404 having several write ports 402, 403, a read port 406, execution units 410 (e.g., FPU), 412 (e.g., FXU), 414 (e.g., PERM), bus 418, line 422, and input thread connection 401; and a right group, including register file 434 having several write ports 432, 433, a read port 436, execution units 440 (e.g., FPU), 442 (e.g., FXU), 444 (e.g., PERM), bus 448, line 446 and input thread connection 431. Processor cycles may again be shown as 426. Thread information may be loaded into the register files 404 and 434 via lines 401 and 431.

In a shared mode, used for a single-thread mode of the processor 400, the content of the first register file 404 may be identical to the content of the register file 434 because all results may be fed in parallel from all execution units to all respective write ports 402, 403 and 432, 433. That is, the data may be mirrored between register files, requiring additional write ports, to allow the processor's execution units to operate on all the thread data.

In a split mode, the left group of execution units may be used for a first thread or a first group of threads, and the right group of execution units may be used for a second thread or a second group of threads. Thus, each thread may only access a certain portion of the execution units and register files, and a specific instance of a register file only services specific execution units and only has to store data from particular threads. This may be possible because the write ports 403 and 433 may be disabled for writing operations, such that results of the first group of execution units 410, 412, 414 of a first thread or group of threads may only be connected for writing results of operations or calculations to the first register file via bus 418 and line 422, whereas results of the execution units 440, 442, 444 of a second thread or group of threads may only be connected for writing results of operations or calculations to the second register file 434 via bus 448 and line 446. It should be noted that lines such as lines 422 and 446 may not be single lines but connection lines with many physical lines running in parallel.

It should be noted that execution units 414 and 444, e.g., PERM units, may only require two processor cycles for an execution. This may be in contrast to examples given above. However, it may also underline that in the context of this application, there is no requirement for a defined number of processor cycles per instruction.

The setup of the architecture according to FIG. 4 may allow—in a shared mode—using an execution unit of the first group requiring more cycles and an execution unit of the second group of execution units to run simultaneously, meaning in parallel to each other, and write their results in parallel to the register files. However, this may not work in the split mode. Thus, the prior art processor 400 according to FIG. 4 may have—in a shared mode—a higher bandwidth if compared to a single register file processor.

Figure 5:
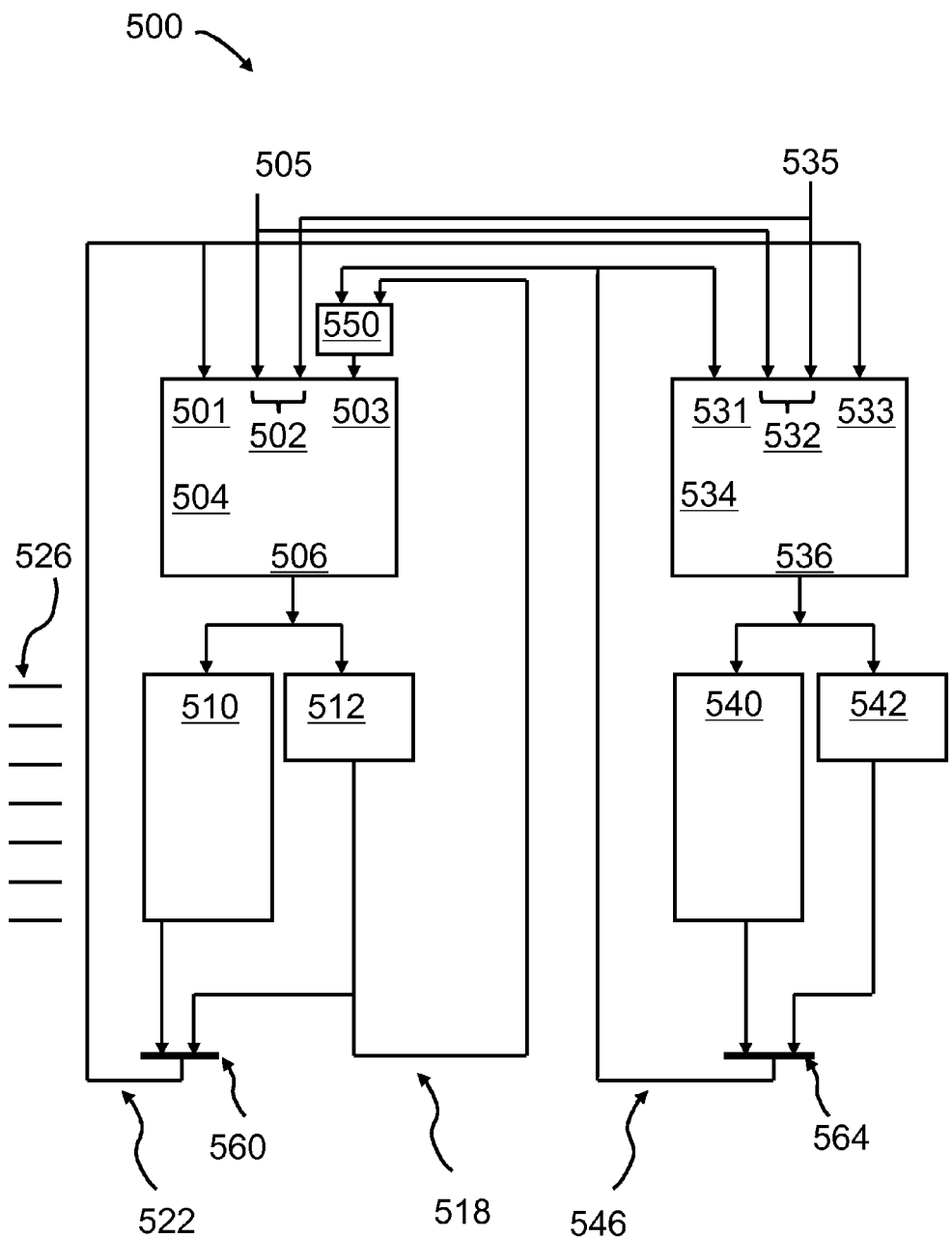
FIG. 5 shows a block diagram of an embodiment of a processor providing register file write port reallocation.

FIG. 5 shows a block diagram of an embodiment of a processor 500 providing register file write port reallocation. There may be provided two register files 504 and 534 with a read port 506 and 536, respectively. Of course, many more read ports may be possible. Additionally, the register files 504 and 534 may include a first write port 501, 531 and a second write port 503 and 533, respectively. A skilled person will understand that more write ports may be possible. The processor 500 may be adapted to be operable in a single-thread mode and in a multi-thread mode. The first and second register files 504, 534 may be designed for storing state information of a thread. There may also be provided a first group of execution units 510, 512 (e.g., an FPU 510 requiring more cycles for completion of an instruction than an FXU 512). These example execution units 510 and 512 may be associated to the first register file 504. A second group of execution units 540, 542 (e.g., an FPU 540 and an FXU or PERM 542) may be associated to the second register file 534, respectively. Threads data may be loaded into the register files via lines 505 and 535. However, the limitation in this embodiment to just two execution units may be understood as an example. More execution units of any kind may be used also in combination with a higher number of register files.

The register files 504, 534 may each be adapted to be operable in a shared mode and in a split mode. In the shared mode, the first register file 504 and the second register file 534 contain the same data. The required cycles per execution unit 510, 512, 540, 542 may symbolically be indicated by the scale 526. Again, the number of cycles required per execution unit may only be used as examples.

In the split mode, threads executed by the processor being in the multi-thread mode may be grouped in a first thread set and a second thread set. There may be one thread in each thread set or more than one thread per thread set. In this mode, the first register file 504 may contain data of the first thread set, and the second register file may contain data of the second thread set.

This may be achieved in the following manner. The first write port 501 of the first register file 504 may be adapted to be used by the first group of execution units 510, 512 for writing their results into the first register file 504. Bus 560 may feed results from the execution units 510 and 512 via line 522 to the first write port of the first register file. The continuation of line 522 to the second write port 533 of the second register file 534 may be blocked such that the second write port 533 of the second register file 534 will be blocked or not enabled for a write operation to the second register file 534. However, in a shared mode, the write port 533 may be enabled, such that the results of the first group of execution units 510, 512 may also be written to the second register file 534.

The first write port 531 of the second register file 534 may as well be adapted to be used by the second group of execution units 540, 542 for writing their results into the second register file 534. This may be achieved by line 546 feeding signals from the results of the execution units 540, 542 via bus 564 to write port 531.

Additionally, a first data controller 550 may be connected to the write port 503 as shown in FIG. 5. In the shared mode, data controller 550 may be adapted to connect results of the second group of execution units 540, 542 to the second write port 503 of the first register file 504.

In contrast to this, in the split mode, the data controller 550 may connect the results of a part, in particular, only the results of the FXU 512, of the first group of execution units 510, 512 via connection 518 to the second write port 503 of the first register file 504. This means that depending on the mode of operation (i.e., single-thread or multi-thread mode), first data controller 550 switches different signals to the second write port 503 of the first register file 504. This is possible because of a "bus split" as may be seen by reference numerals 522, 560 and 518. Thus, the results of the execution unit 512 may be fed via line 518 to write port 503 through data controller 550, and the results of the other execution unit 510 may be fed via line 522 to the first write port of the register file 504. The execution units 510, 512 of the first group may now run in parallel without causing an internal shortcut even if they finish an operation during the same cycle of the processor.

Thus, in split mode, parallel working execution units of the same group (e.g., unit 510 and unit 512) requiring a different number of cycles for completion of an execution may run in parallel without getting in conflict when writing their results into a register file. The split of signals from execution units 510 and 512 and feeding their signals back to write ports of the first register files—partially via data controller 550—may make this possible. Thus, throughput and bandwidth of the processor may be optimized; more instruction per time may be executed in parallel also in split mode.

Processor 500 has a variety of features. For instance, as opposed to a group of execution units having different execution latencies having to share a bus, which may prevent certain executions from occurring contemporaneously and, hence, reduce execution bandwidth, multiple executions may occur contemporaneously, which may increase execution bandwidth. Moreover, processor 500 may, in at least some modes, not need a scheduling unit to schedule these executions to avoid collisions.

Processor 500 may even accomplish this in situations in which the number of write ports is limited. Furthermore, the register files may still be shared in other modes of operation.

While in the shared mode it may be possible to use execution units of different groups (e.g., an FPU of the first group and an FXU from the second group) to run simultaneously and also write simultaneously their results (e.g., to the first register file) by using different write ports, in particular, the first write port and the second write port of the first register file, this would not work in a conventional processor design in a split mode. This would mean that execution units in each group of execution units may not run in parallel if they finish their execution in the same processor cycle. Result write-back shortcuts may be the result as discussed above.

However, the disclosed processor design may allow also running execution units in parallel even if they may finish their execution during the same processor cycle and even if the processor may be running in the split mode. The disclosed concepts may allow such a new aspect of operation only for the left or first group of execution units. However, if another data controller similar to data controller 550 may be connected to the second write port of the second register file, then also the second group of execution units may be operated as already explained for the first group regarding the split mode.

This means that both execution unit groups may have execution units running in parallel in split mode. A shortcut may be avoided, even if the execution units of one group may finish their execution during the same processor cycle. This is possible because the results of execution units requiring a smaller number of execution cycles may be connected to the second write port of the group's register file via the data controller connected to the second write port of the respective register files. The results of the execution unit requiring a larger number of processor cycles may write their results to the respective first write ports at the same time, i.e., during the same processor cycle.

In certain embodiments therefore, the processor also may include a second data controller adapted to, in the shared mode, connect the results of the first group of execution units to the second write port of the second register file and, in the split mode, connect the results of a part of the second group of execution units to the second write port of the second register file, such that the first register file may contain data of the first thread set, and the second register file may contain data of the second thread set. An advantage of such a processor design may be in the fact that both groups of execution units may have—in the split mode—execution units that may run in parallel without getting into conflict because of a different number of cycle times per execution unit. Execution units with a larger number may operate at the same time and finish their execution during same cycle without getting into conflict with the other execution unit of the same group. Thus, the bandwidth of the processor will be larger because execution units do not have to wait for each other.

In other embodiments, the register files may each have additional write ports each. They may be input ports for the stream of data of threads coming in. In shared mode, the threads are cross-fed to both register files. In split mode, the respective other write port of the other register files may be blocked.

The first data controller and the second data controller may, for example, be multiplexers. They may be implemented as switches allowing only one input signal from one write port signal to pass the data controllers at a time. Their switching capabilities may be used to switch connections differently in shared mode and in split mode.

In particular embodiments, the multiplexers may be switchable between a shared multiplexer mode and a split multiplexer mode based on a signal derived from a switching unit that may be adapted to switch the register files from the shared mode to the split mode. This way, a synchronized operation of the processor may be achieved.

In certain embodiments, a first execution unit of the first group and a first execution unit of the second group of execution units may require each a higher number of cycles for a completion of an execution than a second execution unit of each respective group. For example, the first execution units may be FPUs, and the other execution units may be FXUs, PERMs, or any other appropriate type of execution unit. It should also be clear that what has been described as a single execution unit—a first and a second—may also be a group of execution units each. Thus, any combination of execution units may be possible that may have different requirements regarding required cycles for a completion of an execution.

In particular embodiments, an output of the second execution unit of the first group of execution units may be connected to a second bus associated to the first group to feed signals to an input port of the data controller. This bus may allow a split of signals of results of the execution units of the first group of execution units. While the results of the first execution units are fed to a first write port of the first register file, signals of results of the second execution unit of the first group are fed via the first data controller to the second write port of the first register file in split mode.

In certain embodiments, an output of the second execution unit of the second group of execution units may be connected to a second bus associated to the second group, feeding signals to an input port of a second data controller. This may also allow the second group of execution units to run simultaneously in split mode.

In some embodiments, a first bus associated to the first group of execution units is connected to a second bus of the first group feeding signals to the first write ports of the first register file (504) as well as to an input port of a second data controller. This split of busses allows execution units with a smaller number of cycles required for finishing an execution to feed their results independently of the results of the first execution unit to a write port of the register file. It should be noted that more than two execution units per group may be used. A skilled person may understand that there should be no limitation in number of execution units per group. The same applies to the number of groups of execution units. Clearly, more than two groups of execution units may be possible.

Comparably, in particular embodiments, a first bus associated to the second group of execution units is connected to the second bus of the second group feeding signals to the first write port of the second register file (534) as well as to an input port of first data controller (550). This mechanism may accomplish the operations already discussed for the first group of executing units in the split mode, also for the second group.

It is also noteworthy to mention that the second write port of the second register file may be blocked in the split mode. In this case, execution units of the first group may not write computing results to the second register file. Additionally, it should be mentioned that in split mode, the second write port of the first register file may receive results of one of the execution units of the first group, in particular from the one requiring less execution cycles for a completion of an instruction.

Additional execution units and register files are possible. Moreover, the processor may also work with any higher number of register files and execution units.

Figure 6:
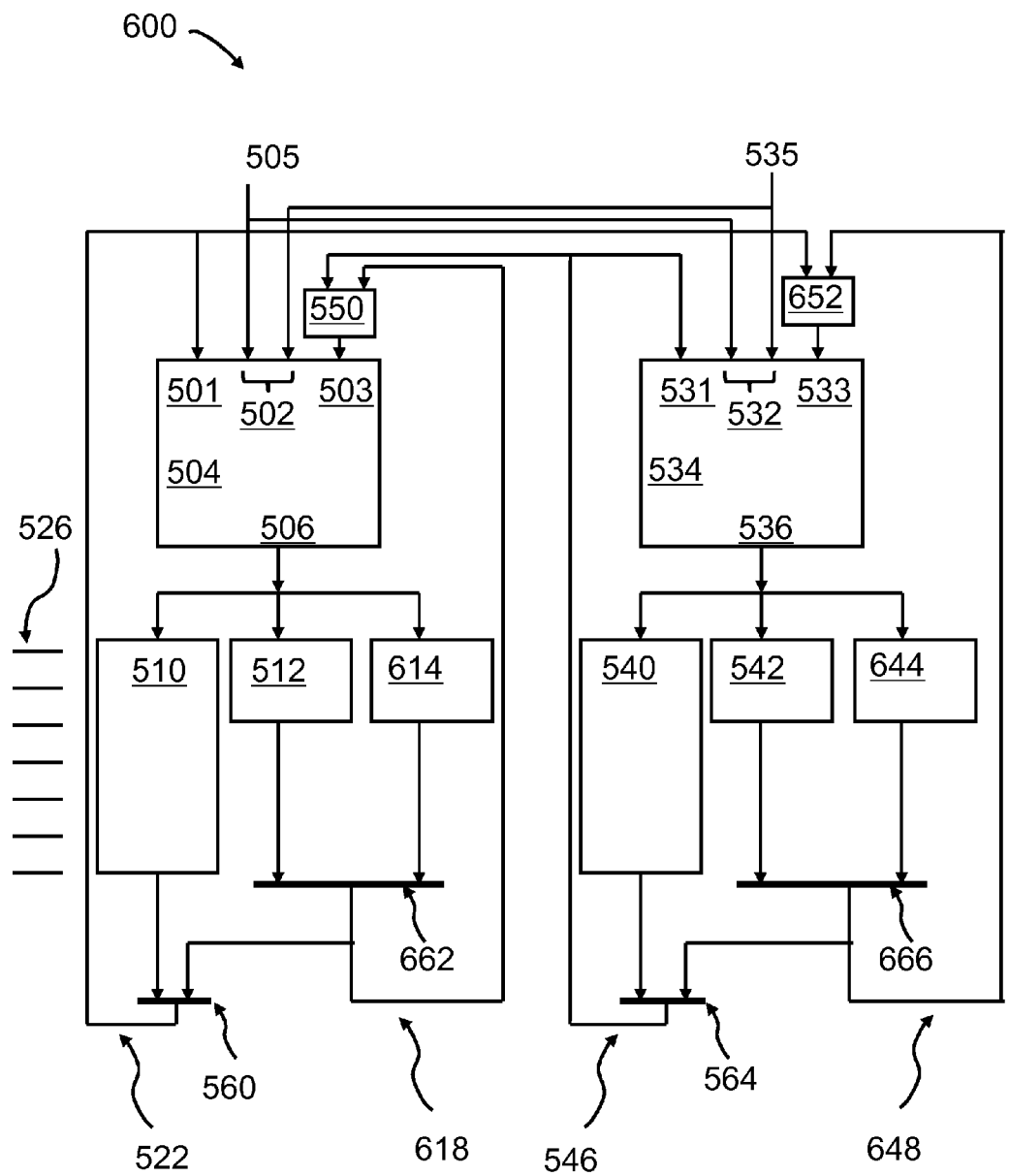
FIG. 6 shows a block diagram of another embodiment of a processor providing register file write port reallocation.

FIG. 6 shows a block diagram of another embodiment of a processor providing register file write port reallocation. Elements having the same function as in FIG. 5 may have the same reference numeral. Additional execution units 614 and 644 of any number and type may be connected to an additional bus 662 and 666, respectively. There may be a connection from the busses 662 and 666 to busses 560 and 564, respectively. Bus 662 may be connected to the data controller 550 as in FIG. 5. However, also the second group of elements may now include a second data controller 652 between bus 666 and the second write port 533 of the second register file 534. This may allow both groups of execution units—in the split mode—to work each in parallel. For example, execution unit 510 and 512 or 614 may execute instructions simultaneously even if they may finish their execution during the same processor cycle. The same applies to the second group of execution units. Only as an example, execution units 512, 614, 542 and 644 may be indicated as requiring two cycles for finishing an operation. Any other operation length may be possible. It may also be clear that any higher number of execution units of any type may be used. In case the number of register files may be more than two, there may also be a requirement for additional data controllers comparable or equivalent to the first and the second data controllers.

Figure 7:
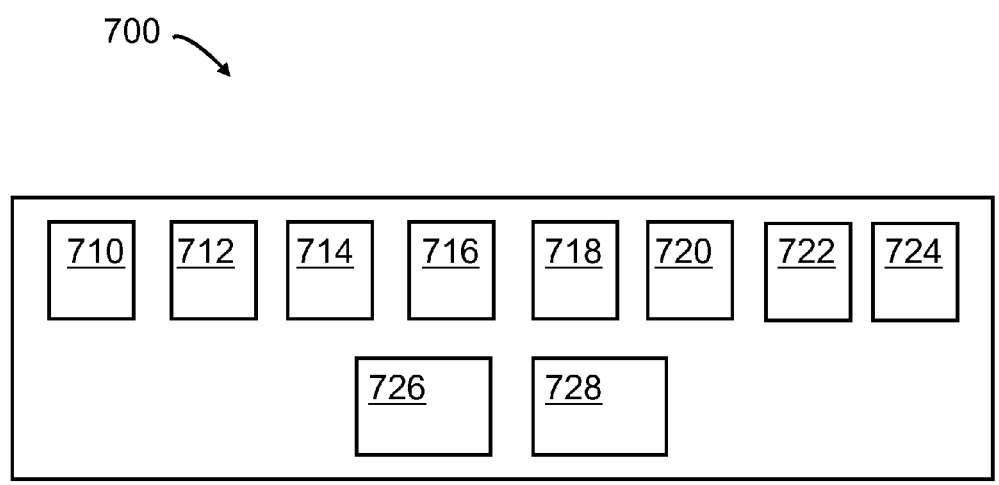
FIG. 7 shows a block diagram of operating a processor using register file write port reallocation.

FIG. 7 shows a block diagram of operating a processor providing register file write port reallocation.

The process 700 for operating a processor may be adapted to be operable in a single-thread mode and in a multi-thread mode, may include:
- storing, 710, state information of a thread in a first register file and a second register file, wherein the first register file and the second register files may include a first write port and second write port each;
- associating, 712, a first group of execution units to the first register file and a second group of execution units to the second register file;
- operating, 714, the register files in a shared mode or in a split mode, such that in the shared mode the first register file and the second register file contain the same data;
- grouping, 716, in the split mode, threads executed by the processor being in the multi-thread mode in a first thread set and a second thread set, such that the first register file contains data of the first thread set, and the second register file contains data of the second thread set;
- using, 718, the first write port of the first register file by the first group of execution units for writing their results into the first register file;
- using, 720, the first write port of the second register file by the second group of execution units for writing their results in to the second register file;
- connecting, 722, in the shared mode, results of the second group of execution units to the second write port of the first register file via a first data controller; and
- connecting, 724, in the split mode, the results of a part of the first group of execution units to the second write port of the first register file.

The method 700 may also include:
- connecting, 726, via a second data controller in the shared mode, the results of the first group of execution units to the second write port of the second register file; and
- connecting, 728, via a second data controller in the split mode, the results of a part of the second group of execution units to the second write port of the second register file, such that the first register file may contain data of the first thread set and the second register file contains data of the second thread set.

While a number of embodiments have been described, those skilled in the art will appreciate that other embodiments may be devised that do not depart from the scope of the subject matter as disclosed herein. Accordingly, the scope of the protected subject matter should be limited only by the attached claims.

It should also be noted that particular embodiments have been described with reference to different subject-matters. In particular, some embodiments have been described with reference to processes, whereas other embodiments have been described with reference to apparatuses. However, a person skilled in the art will gather from the above and the following description that, unless otherwise notified, in addition to any combination of features belonging to one type of subject-matter, also any combination between features relating to different subject-matters, in particular between features of the processes and features of the apparatuses is considered as to be disclosed within this document.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

The invention claimed is:

1. A processor comprising:
a first register file and a second register file for storing state information of one or more threads, wherein the first register file and the second register file each comprise a first write port and a second write port;
a first group of execution units associated to the first register file;
a second group of execution units associated to the second register file;
wherein the register files are each adapted to be operable in a shared mode and in a split mode, such that in the shared mode, the first register file and the second register file contain the same thread information, and in the split mode, threads executed by the processor being in a multi-thread mode are grouped in a first thread set and a second thread set, and the first register file contains information of the first thread set, and the second register file contains information of the second thread set, and wherein the first write port of the first register file is adapted to be used by the first group of execution units for writing their results into the first register file, and the first write port of the second register file is adapted to be used by the second group of execution units for writing their results into the second register file;
a first data controller adapted to, in the shared mode, connect results of the second group of execution units to the second write port of the first register file and, in the split mode, connect the results of a part of the first group of execution units to the second write port of the first register file;
wherein the first group of execution units comprises a first execution unit and a second execution unit, wherein the first and second execution units are coupled to the first write port of the first register file, and wherein a bus connected to an output of the second execution unit is split wherein the output of the second execution unit is further connected to the second write port of the first register file; and
wherein, in the split mode, the first and second execution units are operable to run in parallel and finish an operation during a same cycle of the processor without a conflict when writing their results to the first register file.

2. The processor according to claim 1, further comprising:
a second data controller adapted to, in the shared mode, connect the results of the first group of execution units to the second write port of the second register file and, in the split mode, connect the results of a part of the second group of execution units to the second write port of the second register file, such that the first register file contains information of the first thread set and the second register file contains information of the second thread set.

3. The processor according claim 1, wherein the first execution unit of the first group of execution units requires a higher number of cycles for completion of an execution than the second execution unit of the first group.

4. The processor according to claim 2, wherein the first execution unit of the first group of execution units requires a higher number of cycles for a completion of an execution than the second execution, and a first execution unit of the second group of execution units requires a higher number of cycles for a completion of an execution than a second execution unit of the second group.

5. The processor according to claim 4, wherein an output of the second execution unit of the second group of execution units is connected to a second bus associated to the second group, the second bus feeding signals to the second data controller.

6. The processor according to claim 5, wherein a first bus associated to the second group of execution units is connected to the second bus of the second group, the first bus feeding signals to the first write port of the second register file as well as to the first data controller.

7. The processor according to claim 1, wherein the first register file and the second register file each comprise additional write ports.

8. The processor according to claim 1, wherein the first data controller comprises a multiplexer.

9. The processor according to claim 8, wherein the multiplexer is switchable between a shared multiplexer mode and a split multiplexer mode based on a signal derived from a switching unit that is adapted to switch the register files from the shared mode to the split mode.

10. A method for operating a processor, the method comprising:
   storing state information of one or more threads in a first register file and a second register file, wherein the first register file and the second register file each comprise a first write port and a second write port;
   operating the register files in a shared mode and in a split mode, such that in the shared mode, the first register file and the second register file contain the same thread information, and grouping, in the split mode, threads executed by the processor being in a multi-thread mode in a first thread set and a second thread set, such that the first register file contains information of the first thread set and the second register file contains information of the second thread set;
   writing results of a first group of execution units associated with the first register file into the first register file using the first write port of the first register file;
   writing results of a second group of execution units associated with the second register file into the second register file using the first write port of the second register file;
   connecting, in the shared mode, results of the second group of execution units to the second write port of the first register file; and
   connecting, in the split mode, results of a second execution unit of the first group of execution units via a split bus to the second write port of the first register file and connecting results of a first execution unit of the first group of execution units to the first write port of the first register file, wherein the first and second execution units are operable to run in parallel and finish an operation during a same cycle of the processor without a conflict when writing their results to the first register file.

11. The method according to claim 10, further comprising:
   connecting, in the shared mode, results of the first group of execution units to the second write port of the second register file; and
   connecting, in the split mode, results of a part of the second group of execution units to the second write port of the second register file, such that the first register file contains information of the first thread set and the second register file contains information of the second thread set.

12. The method according to claim 10, further comprising switching a data controller between the connection in the split mode and the connection in the shared mode.

* * * * *